(12) United States Patent
Christensen et al.

(10) Patent No.: US 10,020,482 B2
(45) Date of Patent: Jul. 10, 2018

(54) LI/METAL BATTERY WITH MICROSTRUCTURED SOLID ELECTROLYTE

(71) Applicant: Robert Bosch GmbH, Stuttgart (DE)

(72) Inventors: John F. Christensen, Mountain View, CA (US); Timm Lohmann, Mountain View, CA (US); Christina Johnston, Palo Alto, CA (US); Sarah Stewart, San Carlos, CA (US); Paul Albertus, Washington, DC (US); Aleksandar Kojic, Sunnyvale, CA (US); Boris Kozinsky, Waban, MA (US)

(73) Assignee: Robert Bosch GmbH, Stuttgart (DE)

( * ) Notice: Subject to any disclaimer, the term of this patent is extended or adjusted under 35 U.S.C. 154(b) by 520 days.

(21) Appl. No.: 14/460,798

(22) Filed: Aug. 15, 2014

(65) Prior Publication Data

US 2015/0050543 A1    Feb. 19, 2015

Related U.S. Application Data

(60) Provisional application No. 61/867,050, filed on Aug. 17, 2013.

(51) Int. Cl.
*H01M 2/18*   (2006.01)
*H01M 10/0562*  (2010.01)
(Continued)

(52) U.S. Cl.
CPC ........... *H01M 2/18* (2013.01); *H01M 10/052* (2013.01); *H01M 10/058* (2013.01); *H01M 10/0562* (2013.01); *H01M 2/145* (2013.01); *H01M 2/1653* (2013.01); *H01M 2/1686* (2013.01); *H01M 4/134* (2013.01); *H01M 4/1395* (2013.01); *H01M 4/382* (2013.01); *H01M 2300/0068* (2013.01); *Y02T 10/7011* (2013.01); *Y10T 29/49108* (2015.01); *Y10T 29/49115* (2015.01)

(58) Field of Classification Search
CPC ............................ H01M 2/14; H01M 2/1606
See application file for complete search history.

(56) References Cited

U.S. PATENT DOCUMENTS 5,314,765 A     5/1994  Bates
2005/0008935 A1  1/2005  Skotheim et al.
(Continued)

OTHER PUBLICATIONS

International Search Report and Written Opinion corresponding to PCT Application No. PCT/US2014/051276, dated Nov. 24, 2014 (10 pages).
(Continued)

*Primary Examiner* — Alix E Eggerding
(74) *Attorney, Agent, or Firm* — Maginot Moore & Beck LLP

(57) ABSTRACT

In one embodiment, an electrochemical cell includes an anode including form of lithium, a cathode spaced apart from the anode, and a microstructured composite separator positioned between the anode and the cathode, the microstructured composite separator including a first layer adjacent the anode, a second layer positioned between the first layer and the cathode, and a plurality of solid electrolyte components extending from the first layer toward the second layer.

17 Claims, 5 Drawing Sheets

(51) Int. Cl.
*H01M 10/058* (2010.01)
*H01M 10/052* (2010.01)
*H01M 4/134* (2010.01)
*H01M 2/14* (2006.01)
*H01M 4/1395* (2010.01)
*H01M 2/16* (2006.01)
*H01M 4/38* (2006.01)

(56) References Cited

U.S. PATENT DOCUMENTS

| | | |
|---|---|---|
| 2009/0155676 A1 | 6/2009 | Zhamu et al. |
| 2009/0291353 A1 | 11/2009 | Affinito et al. |
| 2010/0143769 A1 | 6/2010 | Lee et al. |
| 2013/0224632 A1* | 8/2013 | Roumi .................. H01M 2/166 429/516 |
| 2015/0010804 A1* | 1/2015 | Laramie .................. C25B 11/02 429/144 |

OTHER PUBLICATIONS

Christensen, J et al., "A Critical Review of Li/air Batteries, Journal of the Electrochemical Society", 2012. 159(2): p. R1-R30.

* cited by examiner

LI/METAL BATTERY WITH MICROSTRUCTURED SOLID ELECTROLYTE

CROSS REFERENCE

This application claims the benefit of U.S. Provisional Application No. 61/867,050 filed Aug. 17, 2013, the entire contents of which is herein incorporated by reference.

FIELD OF THE DISCLOSURE

The present disclosure relates to batteries and more particularly to lithium-metal batteries.

BACKGROUND

Batteries are a useful source of stored energy that can be incorporated into a number of systems. Rechargeable lithium-ion ("Li-ion") batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (measured in Wh/kg) and energy density (measured in Wh/L) compared to batteries with conventional carbonaceous negative electrodes.

When high-specific-capacity negative electrodes such as lithium are used in a battery, the maximum benefit of the capacity-increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, and $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices.* Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Thus the advantage of using a Li metal negative electrode (sometimes referred to as an anode) is the much higher energy density of the entire cell, as compared to cells with graphitic or other intercalation negative electrode. A disadvantage of using pure Li metal is that lithium is highly reactive. Accordingly, the lithium metal has a propensity to undergo morphology changes, which cause structures having a high surface area to form on and around the negative electrode when the cell is being charged. Exemplary high surface area structures include dendrites and mossy structures.

Dendrites are the most common failure mode for cells with Li metal anodes. The dendrites form with a needle-like structure and can grow through the separator during charging of the cell, resulting in an internal short. "Soft shorts" that burn out rapidly result in a temporary self-discharge of the cell, while "strong shorts" consisting of a higher, more stable contact area can lead to complete discharge of the cell, cell failure, and even thermal runaway. While dendrites typically grow through the separator during charge, shorts can also develop during discharge depending on the external pressure placed on the cell and/or internal volume changes that occur in both the negative and positive electrodes.

Because Li metal is highly electronically conductive, the surface of the Li tends to roughen as the metal is plated and stripped. Peaks in the surface grow as dendrites during charge. During discharge, some smoothing of the dendrites occurs. Nonetheless, there is typically some roughness that remains at the end of discharge. Depending on the depth of discharge, the overall roughness can be amplified from one cycle to the next. Because the metal is essentially at the same electrochemical potential throughout, potential and, to a lesser extent, concentration gradients in the electrolyte phase drive the change in morphology.

Previous Li dendrite growth modeling work has shown that the moving front of a dendrite tends to accelerate during cell charge due to the higher current density localized at the dendrite tip relative to its base. Application of thermodynamic models has shown that dendrite initiation (i.e., initial roughening of an almost perfectly smooth surface) can be suppressed by applying mechanical stress and selecting solid electrolytes with shear moduli on the order of 10 GPa at room temperature. The same models indicate that surface tension at metal-fluid interfaces is insufficient to suppress dendrite initiation.

Related to dendrite initiation and growth is development of the Li morphology, which tends to increase the electrode surface area with cycling and consumes solvent to generate fresh passivation layers. Formation of high-surface-area mossy Li tends to occur during low-rate deposition from a liquid electrolyte, especially if the salt concentration is high. The high surface area combined with high reactivity of Li and flammability of the organic solvent makes for a very reactive and dangerous cell.

Because of the enormous challenge involved in stabilizing the Li surface chemically and mechanically through the use of electrolyte additives, such that passivation remains in effect over hundreds to thousands of cycles, the preferred treatment for rechargeable Li-based cells is the use of a solid-electrolyte membrane that is mechanically robust and chemically stable against both electrodes. Such a barrier removes several simultaneous constraints that the liquid electrolyte otherwise must satisfy, but the requirements for its properties are nonetheless multifaceted and challenging to obtain in a single material.

The barrier must be chemically stable with respect to some or all of the following: the liquid electrolyte in the positive electrode, electronic conductors and catalysts in the positive electrode, the metallic Li negative electrode, reactive species such as oxygen molecules and reaction intermediates, and (in aqueous cells) water. Solid electrolytes must also have sufficient Li+ conductivity over the operating temperature range of the cell, negligible electronic conductivity, and high elastic modulus to prevent Li dendrite initiation.

In order to reduce formation of lithium dendrites, internal shorts, electrolyte decomposition, and lithium morphology changes, a number of approaches involving solid electrolytes that conduct lithium ions but are electronically insulating have been attempted. One such approach involves the use of a poorly conducting amorphous material known as LiPON, which has been used successfully in thin film lithium-metal batteries. However, because of LiPON's low lithium conductivity, it is difficult to make cells with thick, high capacity electrodes and still maintain a desired rate of discharge.

Another approach involves the use of a block copolymer that includes lithium-conducting channels in a matrix of inactive polymer that has a high shear modulus, perhaps high enough to prevent lithium dendrite formation. This approach has several drawbacks: 1) the composite conductivity is too low at room temperature because the intrinsic conductivity of the conducting phase is low, and the high-shear-modulus phase does not conduct lithium ions, thus diluting the composite conductivity further; 2) polymers generally absorb liquids and therefore are not an effective barrier between lithium metal and liquid electrolytes in the positive electrode or separator; 3) Li-conducting polymers are typically unstable at high positive electrode potentials (>3.9 V vs. Li). Hence, lithium-metal cells with such polymer electrolytes are typically used without any liquid electrolyte in the positive electrode, and they are used with low-potential positive electrode materials, such as sulfur or $LiFePO_4$.

Another approach involves imbedding ceramic particles with high Li conductivity in a matrix of conducting polymer, with lower conductivity. In this case, Li ions should preferentially be transported through the ceramic particles due to the higher conductivity compared to the polymer. However, in practice, high interfacial resistance between ceramic particles and at ceramic/polymer interfaces results in very limited transport of Li ions through the ceramic.

What is needed, therefore, is a battery system that reduces the potential for dendrite formation and the undesired morphological changes in the anode of battery cells having metal anodes, and that enables the use of a high-potential positive electrode to increase the overall energy density of the battery.

SUMMARY

In accordance with one embodiment, an electrochemical cell includes an anode including form of lithium, a cathode spaced apart from the anode, and a microstructured composite separator positioned between the anode and the cathode, the microstructured composite separator including a first layer adjacent the anode, a second layer positioned between the first layer and the cathode, and a plurality of solid electrolyte components extending from the first layer toward the second layer.

In one or more embodiments the plurality of solid electrolyte components define a plurality of microstructure cavities therebetween.

In one or more embodiments, the plurality of solid electrolyte components are arranged as a regular array of solid electrolyte components.

In one or more embodiments, the plurality of solid electrolyte components are configured as a regular array of cylindrical components.

In one or more embodiments, the plurality of solid electrolyte components are configured as a regular array of hollow cylindrical components.

In one or more embodiments, the microstructure cavities are filled with a fluid selected for mechanical properties, such that the filled microstructure cavities provide a desired modification of mechanical properties of the cell.

In one or more embodiments, the plurality of solid electrolyte components are configured as a regular array of spring-like components.

In one or more embodiments, the separator further includes a third layer positioned between the second layer and the cathode, a fourth layer positioned between the third layer and the cathode, and a plurality of solid electrolyte components extending from the third layer toward the fourth layer.

In another embodiment, a method of forming an electrochemical cell includes providing an anode including form of lithium, providing a cathode, providing a microstructured composite separator with a first layer, a second layer, and a plurality of solid electrolyte components extending from the first layer toward the second layer, and positioning the microstructured composite separator between the anode and the cathode with the first layer adjacent the anode and the second layer positioned between the first layer and the cathode.

In one or more embodiments providing the microstructured composite separator includes defining a plurality of microstructure cavities between the solid electrolyte components.

In one or more embodiments providing the microstructured composite separator includes providing the microstructured composite separator with a plurality of solid electrolyte components arranged in a regular array of solid electrolyte components.

In one or more embodiments providing the microstructured composite separator includes providing the microstructured composite separator with a plurality of solid electrolyte components arranged in a regular array of cylindrical solid electrolyte components.

In one or more embodiments providing the microstructured composite separator includes providing the microstructured composite separator with a plurality of solid electrolyte components arranged in a regular array of hollow cylindrical components.

In one or more embodiments providing the microstructured composite separator includes determining a desired solid electrolyte component configuration, providing a photosensitive material, writing the desired solid electrolyte component configuration into the photosensitive material using focused ultrashort laser pulses, generating local polymerization of the written desired solid electrolyte component configuration by baking the photosensitive material, removing un-polymerized portions of the photosensitive material, and conformally depositing a solid electrolyte material on a remaining polymerized portions of the photosensitive material.

In one or more embodiments providing the microstructured composite separator includes determining a desired mechanical property, selecting a fluid based upon the determined desired mechanical property, and filling the microstructure cavities with the selected fluid.

In one or more embodiments providing the microstructured composite separator includes providing the microstructured composite separator with a plurality of solid electrolyte components arranged in a regular array of spring-like components.

In one or more embodiments providing the microstructured composite separator includes providing a third layer positioned between the second layer and the cathode, providing a fourth layer positioned between the third layer and the cathode, and providing a plurality of solid electrolyte components extending from the third layer toward the fourth layer.

DESCRIPTION

Figure 1:
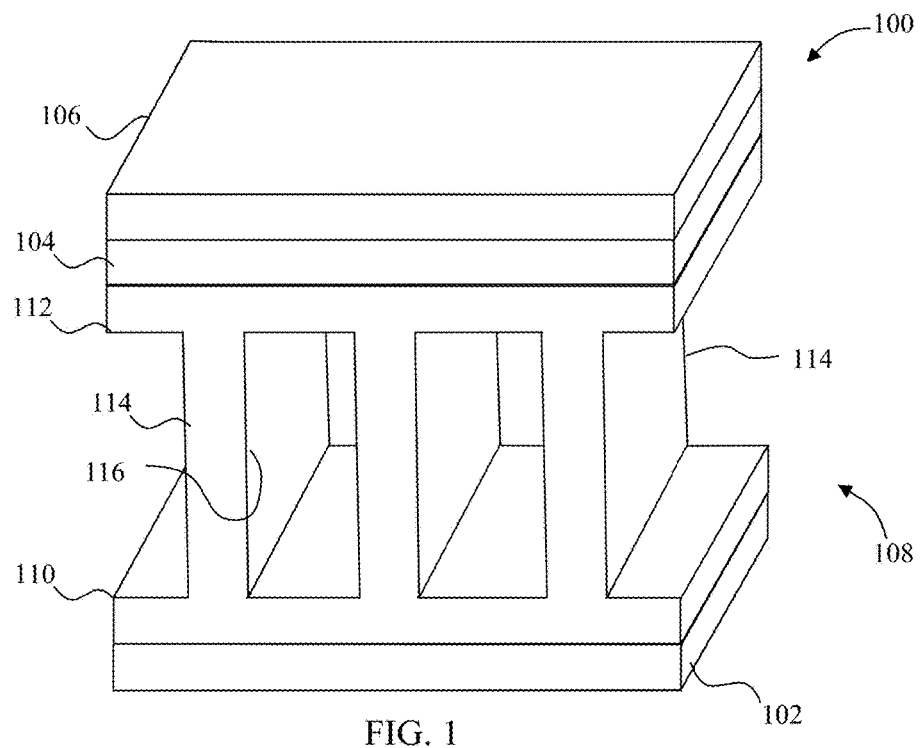
FIG. 1 depicts a simplified perspective view of an electrochemical cell including a microstructured composite separator with solid-electrolyte components in the form of columns which inhibits dendrite formation while allowing flexing of the anodes.

For the purpose of promoting an understanding of the principles of the disclosure, reference will now be made to the embodiments illustrated in the drawings and described in the following written description. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

FIG. 1 depicts an electrochemical cell 100. The electrochemical cell 100 includes an anode 102, a cathode 104 with an aluminum current collector 106, and a microstructured composite separator 108. The anode 102 includes lithium metal or a lithium alloy metal. The anode 102 is sized such that it has at least as much capacity as the cathode 104, and preferably at least 10% excess capacity and up to greater than 50% capacity in some embodiments.

The cathode 104 in various embodiments includes a sulfur or sulfur-containing material (e.g., PAN-S composite or $Li_2S$); an air electrode; Li-insertion materials such as NCM, $LiNi_{0.5}Mn_{1.5}O_4$, Li-rich layered oxides, $LiCoO_2$, $LiFePO_4$, $LiMn_2O_4$; Li-rich NCM, NCA, and other Li intercalation materials, or blends thereof or any other active material or blend of materials that react with and/or insert Li cations and/or electrolyte anions. In some embodiments, the cathode 104 includes Li-conducting liquid, gel, polymer, or other solid electrolyte. The cathode Li-insertion materials may additionally be coated (e.g., via spray coating) with a material such as $LiNbO_3$ in order to improve the flow of ions between the Li-insertion materials and the solid electrolyte, as described in T. Ohtomo et al., Journal of Power Sources 233 (2013) 231-235. Solid electrolyte materials in the cathode 104 may further include lithium conducting garnets, lithium conducting sulfides (e.g., $Li_2S$—$P_2S_5$) or phosphates, $Li_3P$, LIPON, Li-conducting polymer (e.g., PEO), Li-conducting metal-organic frameworks such as described by Wiers et al. "*A Solid Lithium Electrolyte via Addition of Lithium Isopropoxide to a Metal-Organic Framework with Open Metal Sites,*" Journal of American Chemical Society, 2011, 133 (37), pp 14522-14525, the entire contents of which are herein incorporated by reference, thio-LISiCONs, Li-conducting NaSICONs, $Li_{10}GeP_2S_{12}$, lithium polysulfidophosphates, or other solid Li-conducting material. Other solid electrolyte materials that may be used are described in Christensen et al., "A critical Review of Li/Air Batteries", Journal of the Electrochemical Society 159(2) 2012, the entire contents of which are herein incorporated by reference. Other materials in the cathode 104 may include $Li_{7-x}La_3Ta_xZr_{2-x}O_{12}$, wherein 0≤X≤2, electronically conductive additives such as carbon black, and a binder material. The cathode materials are selected to allow sufficient electrolyte-cathode interfacial area for a desired design.

The cathode 104 includes an electrolyte (not shown). The electrolyte in some embodiments is a fluid such as a liquid electrolyte. In other embodiments, a ceramic or other solid, non-polymer electrolyte is used.

The microstructured composite separator 108 conducts lithium ions between the anode 102 and the cathode 104 while blocking electrons and any liquid electrolyte that may be contained in the cathode 104. The microstructured composite separator 108 in the embodiment of FIG. 1 is an integrally formed structure which includes a layer 110 adjacent to the anode 102 and a layer 112 adjacent to the cathode 104. A number of solid-electrolyte components in the form of columns 114 extend between the layer 110 and the layer 112 defining microstructure cavities 116 therebetween.

The microstructured composite separator 108 thus consists of regularly spaced solid-electrolyte components 114 which provide sufficient ionic transport (i.e., by providing a sufficiently high volume fraction of conducing material and by limiting the thickness of the structure between the anode and cathode) and provide mechanical resistance to suppress the formation and growth of lithium dendrites in the anode 102. In the embodiment of FIG. 1, solid-electrolyte components 114 are flexible so as to accommodate volume change of the electrodes.

Figure 2:
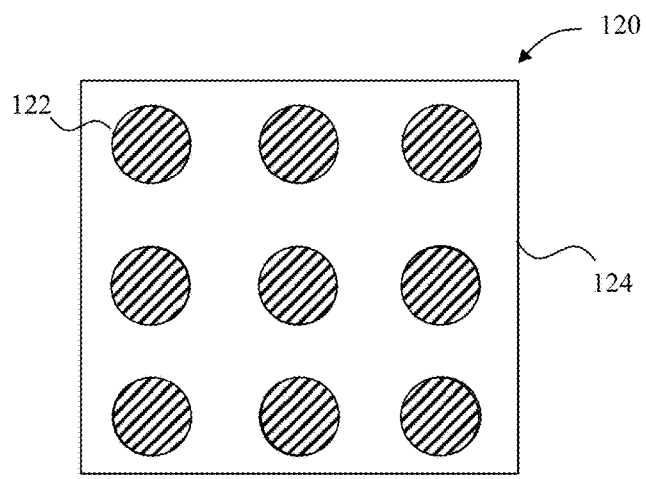
FIG. 2 depicts an aerial view of an electrochemical cell including a microstructured composite separator with solid-electrolyte components in the form of cylinders which inhibits dendrite formation while allowing flexing of the anodes.

While three columns 114 are shown in FIG. 1, there are more or fewer solid-electrolyte components in other embodiments. For example, FIG. 2 depicts an aerial cross-sectional view of a portion of a cell 120 showing solid-electrolyte components 122 and a polymer layer 124. The solid-electrolyte components 122 are configured as a regular array of solid-electrolyte components 122. Depending upon the particular embodiment, the array would include thousands of solid-electrolyte components 122.

Additionally, the solid-electrolyte components may be configured in a variety of forms. In the embodiment of FIG.

Figure 3:
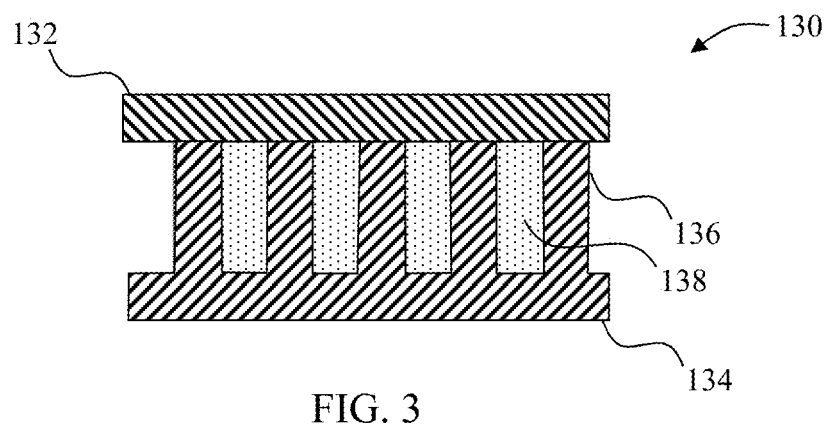
FIG. 3 depicts a side cross-sectional view of an open cell microstructured composite separator with solid-electrolyte components in the form of columns which inhibits dendrite formation while allowing flexing of the anodes.

1, the solid-electrolyte components 116 are in the form of columns while in FIG. 2 the microstructures 122 are in the form of cylinders which in an alternative embodiment are hollow. FIG. 3 depicts a microstructured composite separator 130 that includes an ion conductor slab 132 and an ion conductor columnar layer 134 with a number of columns 136. Adjacent columns 136 define microstructure cavities 138 which in this embodiment are filled with polymer, liquid, or gas to provide a desired flexibility and/or to otherwise modify mechanical properties of the microstructured composite separator 130.

Figure 4:
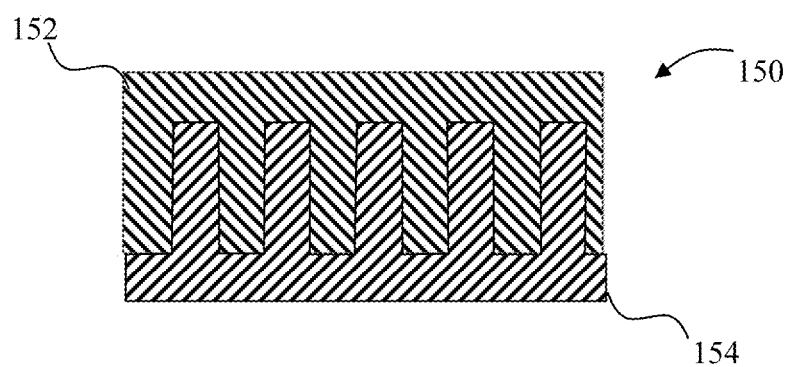
FIG. 4 depicts a side cross-sectional view of a microstructured composite separator with interleaved columns which inhibits dendrite formation.

In some embodiments, there are no cavities in the microstructured composite separator. FIG. 4 depicts an alternative microstructured composite separator 150 that includes a columnar ion conductor slab 152 and a columnar ion conductor slab 154 which are interleaved.

Figure 5:
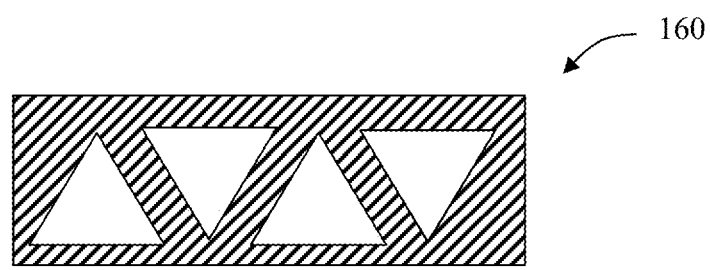
FIG. 5 depicts a side cross-sectional view of a microstructured composite separator with solid-electrolyte components in the form of trusses which inhibits dendrite formation.

While microstructure cavities may be filled with different compositions to provide a desired flexibility and/or to otherwise modify mechanical properties of the microstructured composite separator, the microstructures themselves can also be configured to provide flexibility and/or to otherwise modify mechanical properties of the microstructured composite separator. In addition to the configurations described above, FIGS. 5 and 6 depict microstructured composite separators 160 and 162 which include struts formed in different patterns to provide the desired properties.

Figure 7:
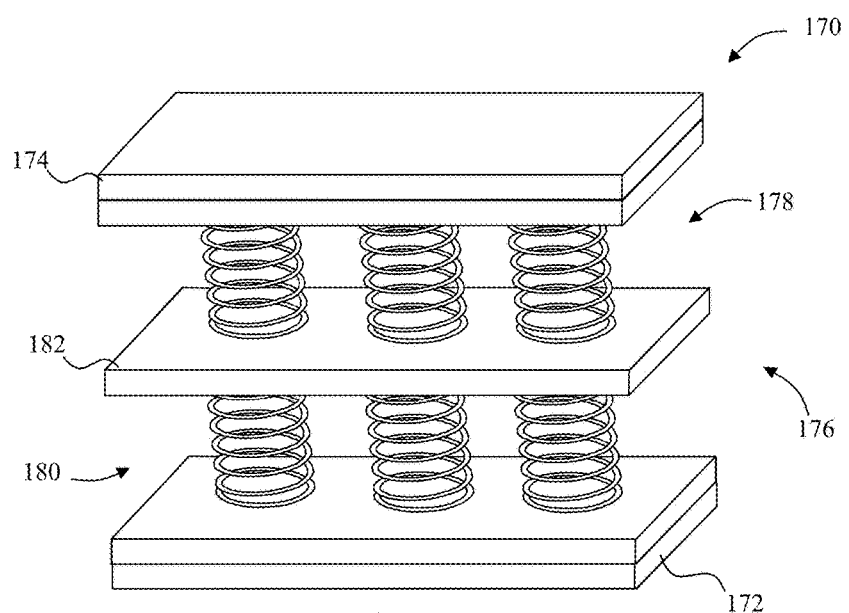
FIG. 7 depicts a side cross-sectional view of a microstructured composite separator with two layers of solid-electrolyte components in the form of springs which inhibit dendrite formation.

Additionally, in some embodiments the desired mechanical resistance is achieved by "stacking" the microstructures. For example, FIG. 7 depicts a cell 170 which includes an anode 172, a cathode 174 and a microstructured composite separator 176. The microstructured composite separator 176 includes two microstructure cavities 178 and 180 in which spring elements 184 and 186, respectively, are formed. The microstructure cavities 178 and 180 are separated by a Li-conducting ceramic and/or polymer layer 182. The spring elements 184 and 186 in one embodiment are integrally formed with the conducting ceramic and/or polymer layer 182. The cell 170 is in other respects like the cell 100.

Figure 8:
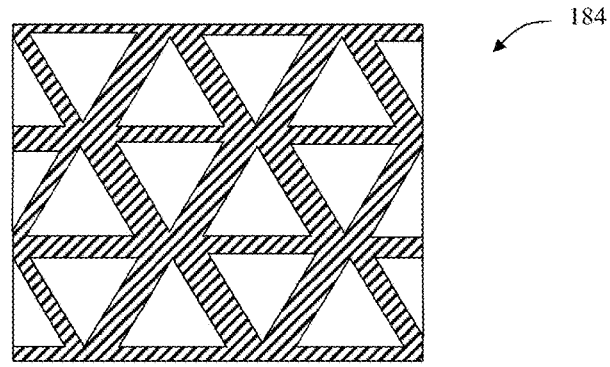
FIG. 8 depicts a side cross-sectional view of a microstructured composite separator with three layers of solid-electrolyte components in the form of struts which inhibit dendrite formation.

While FIG. 7 shows a stacking of two elements, the stacking (depth) as well as the width and length of a particular microstructured composite separator will vary depending upon the particular embodiment. FIG. 8, for example, depicts a microstructured composite separator 184 which incorporates the strut structure of FIG. 5 with three stacked layers of struts which are integrally formed in a single layer of material.

The microstructures described herein may be fabricated by any of several methods, including CVD growth of columns, lithographic processes, etc. In one embodiment, a "3D laser lithography direct laser writer" is used. This process is disclosed more fully at http://www.nanoscribe.de/en/technology/direct-laser-writing. In general, the chemical property of a photosensitive material is altered by focusing ultrashort laser pulses into the photosensitive material. The wavelength of the laser is one at which the photoresist would typically be completely transparent to the laser. By using ultrashort pulses, however, the likeliness of multi-photon absorption, in most cases two-photon absorption, at the focus of the laser is increased. In a subsequent baking process, local polymerisation (in the case of using the photoresist SU-8) occurs at the altered area.

Consequently, by scanning the photoresist relative to the fixed focal position of the laser, arbitrary 3D structures can be written into the photosensitive material (e.g. IP Resists, SU-8, Ormocere, PDMS, chalcogenide glasses). Once the 3D structure has been written into the photoresist, unpolymerized parts of the photoresist can be dissolved and or washed away, leaving the desired structure intact. In a subsequent step, a solid electrolyte is deposited conformally on top of or in the interstices of the 3D structure. This deposition method may include electroless deposition, sputtering or some other physical vapor deposition, chemical vapor deposition, atomic layer deposition, etc. The remaining polymer may also be removed, leaving only the solid electrolyte intact, or the polymer may be left within the structure. The crystallinity of the solid-electrolyte may optionally be enhanced via annealing at elevated temperature. Finally, the interstices of the solid electrolyte structure may be infiltrated with polymer (e.g., by polymerization of a solution of monomers), liquid, or gas.

Figure 9:
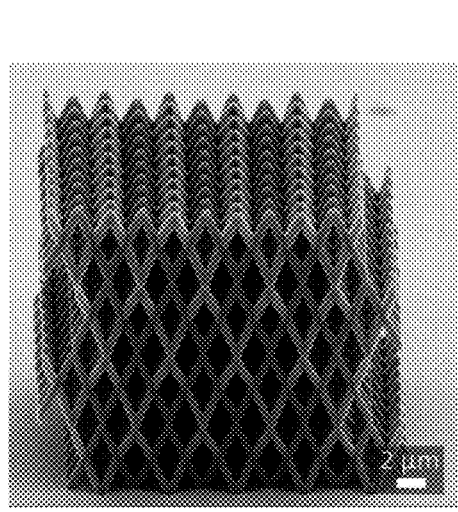
FIGS. 9-11 depict microphotographs of three dimensional microstructures that can be used in the disclosed microstructured composite separators.
Figure 10:
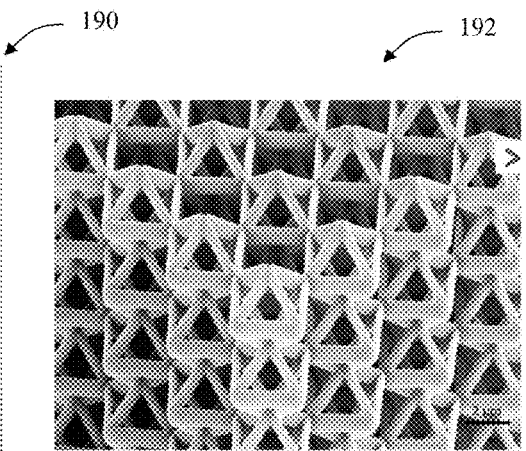
Figure 11:
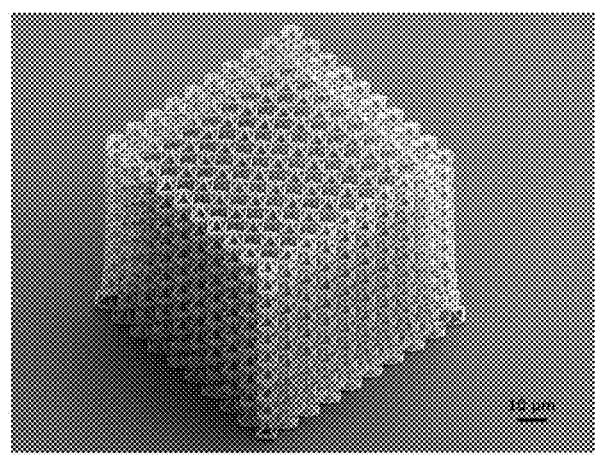

FIGS. 9, 10, and 11, which were published on the internet at http://www.nanoscribe.de/en/applications and depict microstructures 190, 192, and 194 which were formed by Nanoscribe GmbH of Germany using the above described process, are examples of microstructures that can be used in forming a microstructured composite separator. The microstructures in different embodiments are formed from lithium conducting garnets, lithium conducting sulfides (e.g., $Li_2S$—$P_2S_5$) or phosphates, LIPON, Li-conducting polymer (e.g., PEO), Li-conducting metal-organic frameworks such as described by the Wiers article, $Li_3N$, $Li_3P$, thio-LISiCONs, Li-conducting NaSICONs, $Li_{10}GeP_2S_{12}$, lithium polysulfidophosphates, or other solid Li-conducting material. Other solid electrolyte materials that may be used include $Li_{7-x}La_3Ta_xZr_{2-x}O_{12}$, wherein $0 \leq X \leq 2$ as well as those described in the Christensen article and the references therein.

Figure 12:
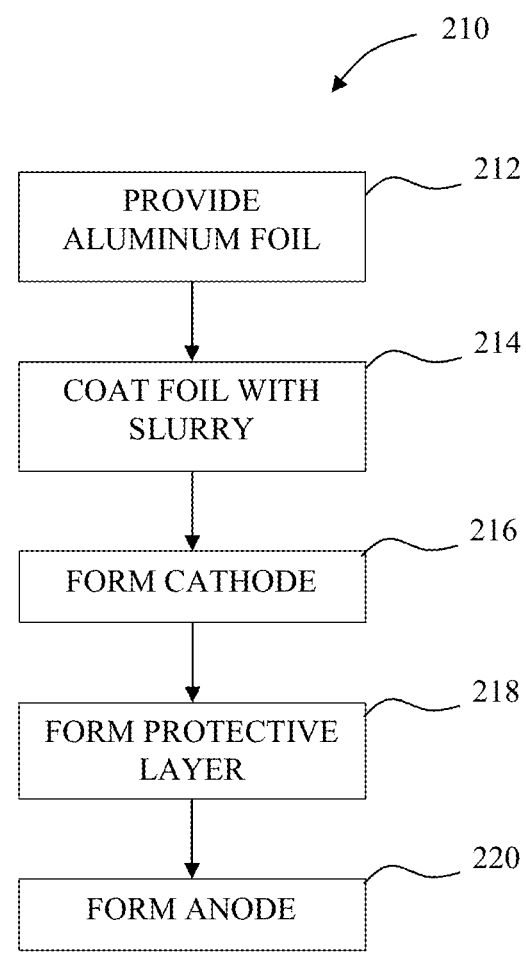
FIG. 12 depicts a flow diagram of an exemplary procedure that may be performed to produce electrochemical cells including a microstructured composite separator which inhibits dendrite formation.

A process 210 for forming electrochemical cells such as those described above is depicted in FIG. 12. At block 212, an aluminum foil is provided. The aluminum foil is coated with a slurry at block 214. The slurry is a blend of ceramic powder (e.g., Li-conducting garnet), positive electrode active material (e.g., transition metal oxide), conductive additive (e.g., carbon black), binder (e.g., PVDF), and sacrificial solvent (e.g., NMP). The cathode is then formed from the aluminum coated slurry (block 216). Formation of the cathode in some embodiments is accomplished simply by allowing the solvent to evaporate. Evaporation in some embodiments is assisted by use of a heated coater and/or an infrared heater. In some embodiments, forming the cathode includes densifying the slurry coated aluminum foil using a roll press or other source of pressure possibly in the presence of heat.

Next, the protective layer is formed as described above (block 218). Finally, the anode is formed (block 220). Formation of the anode includes sandwiching the microstructured composite separator between the aluminum foil/cathode/protective layer formed above and the Li metal negative electrode. For all-solid-state embodiments, the cell is then substantially complete.

The above described process 210 can be modified to form the other embodiments of electrochemical cells disclosed herein as well as other variants. For example, a process for formation of an initially lithium free anode is substantially identical to the process 210 except that no Li metal is required when making the cell. In this variation, the microstructured composite separator is sandwiched between the aluminum foil/cathode/protective layer and a copper foil. The Li metal will be generated in the anode between the microstructured composite separator and Cu foil during the first charging of the battery.

The disclosed embodiments thus provide an electrochemical energy storage cell with a lithium-metal or lithium-alloy negative electrode, a microstructured separator, and a positive electrode that inserts or reacts with lithium ions or negative counterions reversibly. The battery cathode may be, for instance, a sulfur or sulfur-containing material (e.g., Li2S), an air electrode, or be comprised of any other active material or blend of materials that react with and/or insert Li cations and/or electrolyte anions. The separator consists of a regular repeating structure composed of a Li-conducting solid electrolyte, the pores of which may be filled with some other solid (e.g., polymer), liquid, or gas. The solid electrolyte conducts lithium ions but is electronically insulating. The interstitial material may be ionically conducting or inert. Consequently, the microstructured composite separator conducts lithium ions between the anode and the cathode while blocking electrons and any liquid electrolyte that may be contained in the positive electrode. The composite further prevents initiation and/or propagation of lithium dendrites from the negative electrode toward the positive electrode by mechanically suppressing roughening of the lithium. Additional layers of ionically conducting material may be incorporated into the separator.

In some embodiments, the microstructured composite separator is rigid, while in others it is flexible so as to accommodate volume change of the Li electrode. The interstices of the microstructured composite separator may be filled with polymer, liquid, or gas to improve the composite's flexibility and/or to modify otherwise its mechanical properties.

The microstructured composite separator may consist of several different layers. Some layers that may be included are a conducting polymer (e.g., polyethylene oxide) between the Li anode and the first microstructured composite, a Li-conducting ceramic layer between the cathode and one of the composite microstructures, multiple microstructures of the same or different configuration and of the same or different materials, and Li-conducting ceramic and/or polymer layers in between layers of any two composite microstructures.

These additional layers may further enhance the ability of the microstructured composite separator to prevent transport of electrons and any liquid contained in the cathode, and to prevent dendrites from shorting the cell. They may also improve the mechanical properties of the microstructured composite separator to accommodate volume changes in one or both electrodes.

The disclosed embodiments this provide volume fraction of solid electrolyte greater than 20% of the composite, and sometimes greater than 50%. The thickness of each microstructured composite layer is typically less than 100 μm and in some embodiments less than 10 μm The diameter of the structural components in the microstructured composite separator (e.g., column or spring or segment of truss) is typically in the range of 20 nm to 1 mm, and in some embodiments between 100 nm and 10 μm.

As described above, the structural elements in the microstructured composite separator may themselves be hollow or porous, with the interstices optionally filled with polymer or some other material.

Figure 6:
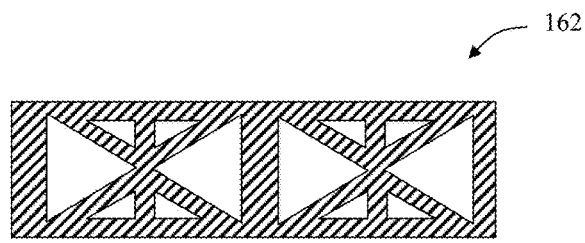
FIG. 6 depicts a side cross-sectional view of a microstructured composite separator with solid-electrolyte components in the form of trusses which inhibits dendrite formation.

The structures in the microstructured composite separator may be "closed" such as in FIGS. 1, 6, and 7 or "open" such as in FIG. 3. Open structures may have a slab of solid electrolyte placed on top of the structure after it is infiltrated with polymer, liquid, or gas.

An electrochemical cell in accordance with the above described embodiments allows for battery operation at lower temperatures (e.g., between −40 and 70° C.) without excessive degradation of the cell. Additionally, aging mechanisms such as lithium dendrites, lithium morphology change, internal shorts, and liquid electrolyte decomposition are reduced.

The disclosed embodiments also provide favorable mechanical properties (e.g., flexibility, high shear modulus) while exhibiting low contact resistance between the lithium metal and the solid electrolyte.

The disclosed embodiments enable the use of positive electrode materials with high potential vs. Li (e.g., Li-rich NCM, NCA, $LiMnPO_4$, $LiMn_2O_4$, and other Li intercalation materials with potential >3.9 V, or blends thereof). Consequently, the disclosed embodiments provide high specific energy and specific power.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. An electrochemical cell, comprising:
an anode including form of lithium;
a cathode spaced apart from the anode; and
a microstructured composite separator positioned between the anode and the cathode, the microstructured composite separator including a first layer adjacent the anode, a second layer positioned between the first layer and the cathode, and a plurality of solid electrolyte components extending from the first layer toward the second layer, wherein the plurality of solid electrolyte components define a plurality of microstructure cavities therebetween.

2. The cell of claim 1, wherein the plurality of solid electrolyte components are arranged as a regular array of solid electrolyte components.

3. The cell of claim 2, wherein the plurality of solid electrolyte components are configured as a regular array of cylindrical components.

4. The cell of claim 2, wherein the plurality of solid electrolyte components are configured as a regular array of hollow cylindrical components.

5. The cell of claim 2, wherein the microstructure cavities are filled with a fluid selected for mechanical properties, such that the filled microstructure cavities provide a desired modification of mechanical properties of the cell.

6. An electrochemical cell, comprising:
an anode including form of lithium;
a cathode spaced apart from the anode; and
a microstructured composite separator positioned between the anode and the cathode, the microstructured composite separator including a first layer adjacent the anode, a second layer positioned between the first layer and the cathode, and a plurality of solid electrolyte components extending from the first layer toward the second layer, wherein the plurality of solid electrolyte components are configured as a regular array of spring-like components.

7. The cell of claim 6, the separator further comprising:
a third layer positioned between the second layer and the cathode;
a fourth layer positioned between the third layer and the cathode; and
a plurality of solid electrolyte components extending from the third layer toward the fourth layer.

8. The electrochemical cell of claim 6, wherein the first layer is formed from at least one of a lithium conducting ceramic and a lithium conducting polymer.

9. The electrochemical cell of claim 8, wherein the first layer and the plurality of solid electrolyte components are an integrally formed structure.

10. A method of forming an electrochemical cell, comprising:
   providing an anode including form of lithium;
   providing a cathode;
   providing a microstructured composite separator with a first layer, a second layer, and a plurality of solid electrolyte components extending from the first layer toward the second layer; and
   positioning the microstructured composite separator between the anode and the cathode with the first layer adjacent the anode and the second layer positioned between the first layer and the cathode, wherein providing the microstructured composite separator comprises:
   defining a plurality of microstructure cavities between the solid electrolyte components.

11. The method of claim 10, wherein providing the microstructured composite separator comprises:
   providing the microstructured composite separator with a plurality of solid electrolyte components arranged in a regular array of solid electrolyte components.

12. The method of claim 11, wherein providing the microstructured composite separator comprises:
   determining a desired mechanical property;
   selecting a fluid based upon the determined desired mechanical property; and
   filling the microstructure cavities with the selected fluid.

13. The method of claim 11, wherein providing the microstructured composite separator comprises:
   providing the microstructured composite separator with a plurality of solid electrolyte components arranged in a regular array of cylindrical solid electrolyte components.

14. The method of claim 11, wherein providing the microstructured composite separator comprises:
   providing the microstructured composite separator with a plurality of solid electrolyte components arranged in a regular array of hollow cylindrical components.

15. The method of claim 14, wherein providing the microstructured composite separator comprises:
   determining a desired solid electrolyte component configuration;
   providing a photosensitive material;
   writing the desired solid electrolyte component configuration into the photosensitive material using focused ultrashort laser pulses;
   generating local polymerization of the written desired solid electrolyte component configuration by baking the photosensitive material;
   removing un-polymerized portions of the photosensitive material; and
   conformally depositing a solid electrolyte material on a remaining polymerized portions of the photosensitive material.

16. The method of claim 10, wherein providing the microstructured composite separator comprises:
   providing the microstructured composite separator with a plurality of solid electrolyte components arranged in a regular array of spring-like components.

17. The method of claim 16, wherein providing the microstructured composite separator comprises:
   providing a third layer positioned between the second layer and the cathode;
   providing a fourth layer positioned between the third layer and the cathode; and
   providing a plurality of solid electrolyte components extending from the third layer toward the fourth layer.

* * * * *